United States Patent [19]
Hentschel

[11] 4,241,960
[45] Dec. 30, 1980

[54] SLIDE BUSHING FORMED OF FLAT SLIP STEEL BAND WITH ANTIFRICTION COATING

[75] Inventor: Georg Hentschel, Schweinfurt, Fed. Rep. of Germany

[73] Assignee: SKF Industrial Trading & Development Co. B.V., Nieuwegein, Netherlands

[21] Appl. No.: 742,572

[22] Filed: Nov. 17, 1976

[30] Foreign Application Priority Data

Nov. 26, 1975 [DE] Fed. Rep. of Germany ... 7537522[U]

[51] Int. Cl.³ .................................................. F16C 9/00
[52] U.S. Cl. .................................................. 308/237 R
[58] Field of Search ............... 308/237 R, 237 A, 238, 308/4 A, 26, 23, 36, 37; 29/149.5 R, 149.5 C, 149.5 S, 149.5 NM

[56] References Cited

U.S. PATENT DOCUMENTS

| 2,852,322 | 9/1958 | Fisher | 308/237 |
| 3,087,842 | 4/1963 | Borras | 148/3 |
| 3,285,680 | 11/1966 | Dailey | 308/237 |
| 3,353,879 | 11/1967 | Jörn | 308/26 |
| 3,929,392 | 12/1975 | Ogino | 308/26 |

Primary Examiner—Douglas C. Butler
Attorney, Agent, or Firm—Daniel M. Rosen

[57] ABSTRACT

A slide bushing, adapted to be sprung into a round housing bore, is formed of a spring steel band having a thickness between 0.2 and 0.5 millimeters, and is provided with a plastic antifriction layer on the inner surfaces thereof. The slide bushing, when not installed, is in the form of an ellipse having a ratio of length between the major and the minor axes of 1:0.9, with the minor axis intersecting the slit.

4 Claims, 3 Drawing Figures

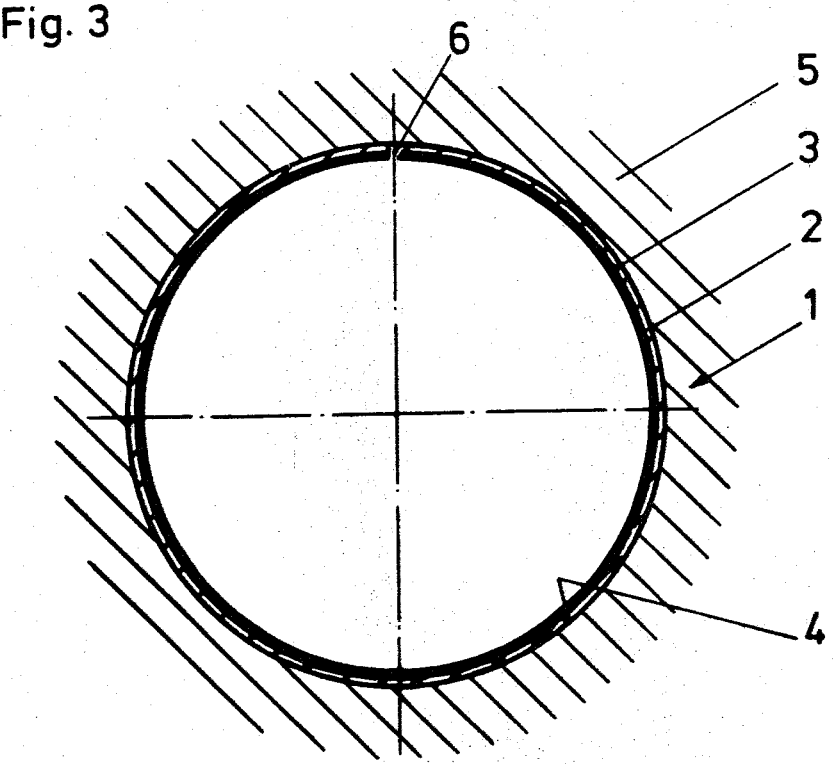

SLIDE BUSHING FORMED OF FLAT SLIP STEEL BAND WITH ANTIFRICTION COATING

This invention relates to an axially slit slide bushing having an antifriction layer, adapted to be spring loaded in a round housing bore.

Spring steel slide bushings are known, in which the thickness or strength of the steel band employed must be determined in dependence upon the size of the bore of the bearing so that the slide bushing presses uniformly against the housing walls in the housing bore. This known slide bushing has the disadvantage that the thickness of the spring steel band varies between wide limits, in dependence upon the diameter of the bearing bore, so that economical manufacture is made difficult due to the necessity of providing many types of steel bands with different band thicknesses. In addition, there is the tendency for the formation of detrimental folds or buckling in the spring steel band and/or the slide layer provided on the band, due to the rolling and resilient spreading inwardly thereof, especially if too thick or too thin spring steel bands are used.

The present invention, however, is directed to the provision of an improved slide bushing of the above type, which overcomes these advantages, and which also can be rolled without the danger of such folding or buckling, and which can be fastened in the housing bore with uniform spring pressure. Moreover, the slide bushing in accordance with the invention is economically produceable from a band, whereby a band of a single thickness can be employed for slide bushings of many different diameters.

Briefly stated, in accordance with the invention, a slide bushing is made from a flat steel band with a wall thickness of 0.2 to 0.5 millimeters and, in tne noninstalled state is in the form of an ellipse with a relative ratio of the lengths of the major and minor axes of 1:0.9. The slit intersects the minor axis. Due to the use of this form of the slide bushing, the resilient side surfaces of the slide bushing press uniformly against the interior surfaces in the housing bore, when the bushing is installed in a round housing bore, so that a sufficiently round form for the installed slide bushing is insured. In addition, the slide bushing is firmly affixed in the housing bore due to the uniformity of the resilient pressure of the slide bushing on the circumference of the housing bore, and the danger of loosening or misplacement of the slide bushing during use is prevented.

The slide bushing in accordance with the invention can be produced in a simple economical manner from a spring steel band provided with a layer of slidable plastic material, by severing a plastic coated spring band and rolling or bending it to an elliptical shape. As a result, the detrimental formation of folds and buckling of the spring steel band or the plastic layer is avoided, since the spring steel band is relatively thin.

In a preferred embodiment of the invention the bushing is formed of a band of sufficient length that the slit provided between the cut or otherwise formed ends of the installed slide bushing is maintained. This slit decreases or increases as a function of the diameter variation of the housing bore and corresponds to the cutting or severing tolerance of the cut-off slide bushing. Dangerous overlapping of the ends of the slide bushing is thereby avoided by the increased diameter tolerance or cutting off tolerance.

In order that the invention will be more clearly understood, it will now be explained in greater detail with reference to the accompanying drawing, wherein:

FIG. 3 is a cross-sectional view of the slide bushing of the invention, installed in a housing bore.

Figure 1:
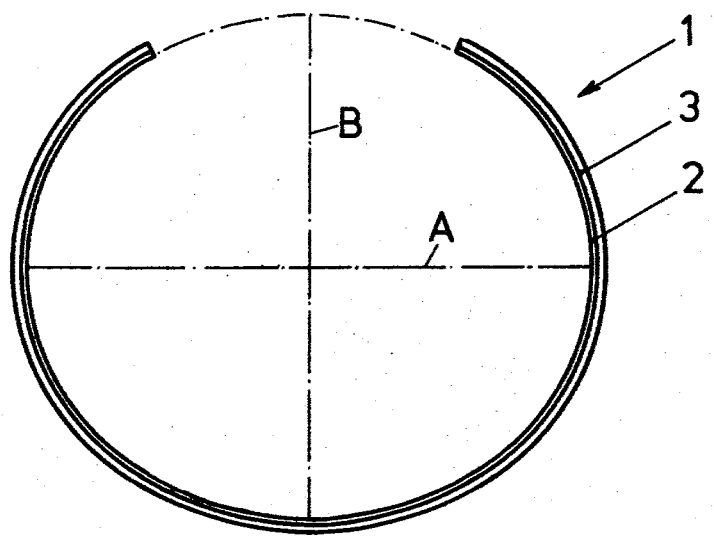
FIG. 1 is a side view of a slide bushing in accordance with the invention.
Figure 2:
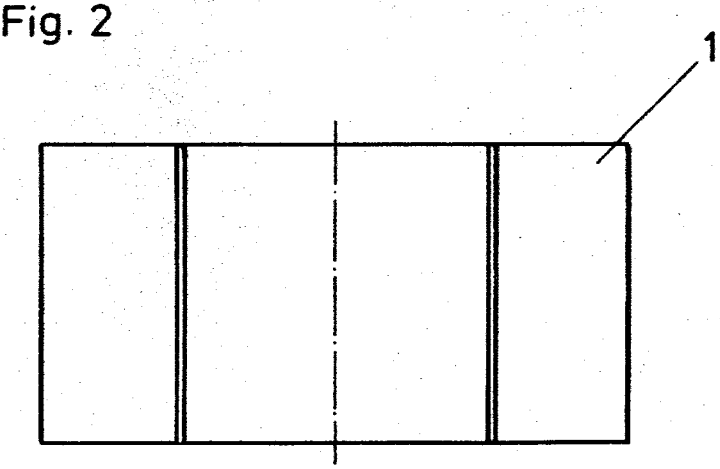
FIG. 2 is a top view of the slide bushing in accordance with FIG. 1.

Referring now to FIGS. 1 and 2, the slide bushing 1 in accordance with the invention is comprised of a spring steel band 3, having a layer 2 of an antifriction material, for example, a layer of polyamide plastic on the running surface of the bushing, that is, on the inner surface thereof. FIGS. 1 and 2 show the slide bushing in the free condition, that is, not installed in a housing. As is evident from FIG. 1, the slide bushing 1 has an elliptical form. The ends of the major axis A of the ellipse intersect opposite sides of the slide bushing, while the minor axis B extends through the region of the slit 6. According to the invention, the ellipse has a ratio between the major axis A and the minor axis B of about 1:0.9.

FIG. 3 shows the slide bushing in accordance with the invention in the installed condition, in which it is sprung into the bore 4 of the housing 5 in such a manner that the slit 6 between the cut ends of the slide bushing still exists. This slit can decrease or increase somewhat as a function of the diameter variation of the housing bore 4. As a result of the use of the relatively thin spring steel band 3, that is, having a thickness from 0.2 to 0.5 millimeters, the slide bushing rests easily, that is, without the use of great force, in the housing bore 4, so that a uniform resilient bearing of the slide bushing 1 in the housing bore 4 is insured.

While the invention has been disclosed and described with reference to a single embodiment, it will be apparent that variations and modifications may be made therein, and it is intended in the following claims to cover each such variation and modification as falls within the true spirit and scope of the invention.

What is claimed is:

1. In a slide bushing formed of a flat spring steel band having a coating of an antifriction material, and adapted to be sprung into a round housing bore, the improvement wherein said band has a wall thickness between 0.2 and 0.5 millimeters, said slide bushing having an elliptical shape with an axially extending slit when it is not installed in a housing bore, with the ratio between the major and minor axes thereof being substantially 1:0.9, the minor axis extending through the slit of the ellipse.

2. The slide bushing of claim 1, wherein said steel band has a length less than the circumference of said housing bore in which the slide bushing is adapted to be inserted, whereby the slit between the ends of the band forming the bushing is maintained.

3. The method of providing a bushing for a round housing bore, comprising the steps of providing a spring steel band having a coating of an antifriction material on one side thereof and an axially extending slit by severing a spring steel strip, the spring steel band having a thickness between 0.2 and 0.5 millimeters and a length less than the circumference of the housing bore by a distance substantially corresponding to the severing tolerance of the band, forming said band into an elliptical shape with a ratio between the major and minor axes of substantially 1:0.9, the minor axis of the ellipse extending through the slit between the ends of the band, and then springing said elliptically formed bushing into said housing bore.

4. In the combination of a slide bushing formed of a flat spring steel band having a layer of an antifriction material, and a housing having a round bore, said steel band being sprung into said housing bore, the improvement wherein said band has a wall thickness between 0.2 and 0.5 millimeters, said slide bushing having an elliptical shape with an axially extending slit when it is not installed in said housing bore, the ratio between the major and minor axes of said elliptical shape being substantially 1:0.9, the minor axis intersecting the slit of said elliptical shape, said steel band having a length less than the circumference of said housing bore, whereby the slit between the ends of said band forming said slide bushing is maintained when said bushing is sprung into said housing bore.

* * * * *

UNITED STATES PATENT AND TRADEMARK OFFICE
CERTIFICATE OF CORRECTION

PATENT NO. : 4,241,960
DATED : December 30, 1980
INVENTOR(S) : Georg Hentschel

It is certified that error appears in the above—identified patent and that said Letters Patent is hereby corrected as shown below:

First page, title of invention, change "SLIP" to -- SLIT --.

Column one, line 37, change "tne" to --the--.

Signed and Sealed this

Fifteenth Day of September 1981

[SEAL]

Attest:

Attesting Officer

GERALD J. MOSSINGHOFF
Commissioner of Patents and Trademarks